Nov. 6, 1928. 1,690,682
K. IMHOFF ET AL
METHOD OF AND APPARATUS FOR DEALING WITH FLOATING SLUDGE
IN DIGESTION CHAMBERS FOR SEWAGE TREATMENT
Filed Aug. 25, 1924
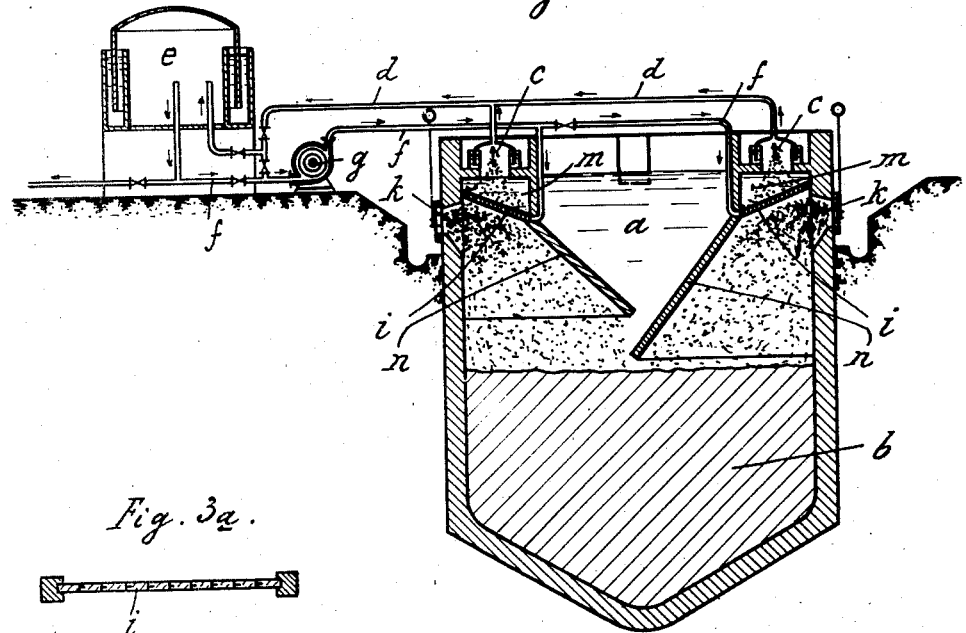
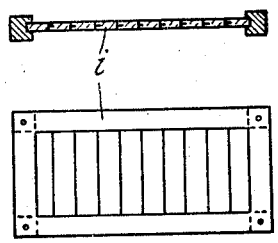
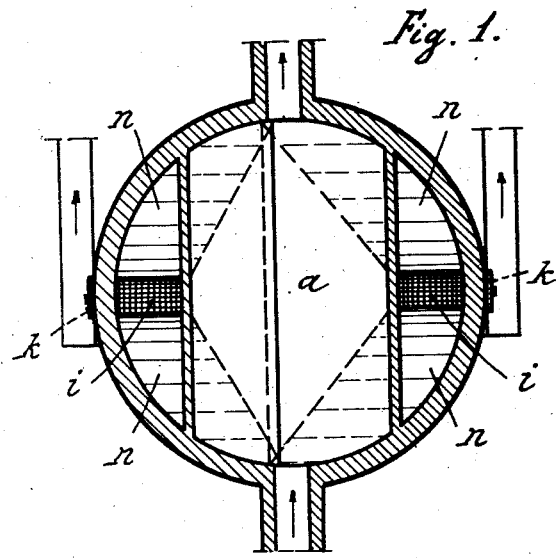

Patented Nov. 6, 1928.

1,690,682

UNITED STATES PATENT OFFICE.

KARL IMHOFF AND FRANZ FRIES, OF ESSEN, GERMANY.

METHOD OF AND APPARATUS FOR DEALING WITH FLOATING SLUDGE IN DIGESTION CHAMBERS FOR SEWAGE TREATMENT.

Application filed August 25, 1924, Serial No. 734,009, and in Germany May 7, 1924.

The floating sludge formed in the digestion chambers of sewage treatment plants, for instance of Imhoff tanks, acts detrimentally upon the proper working of said plants. Floating sludge exposed for some time to the atmosphere at the water surface, soon hardens so that it cannot be discharged through pipes but must be removed manually or by mechanical means which adds to the cost of disposal.

The formation of hard floating sludge can be completely avoided by inserting in the digestion chamber below water level a cover so as to keep the floating sludge completely and continuously submerged in order that it does not come in contact with the atmosphere. The floating sludge remains in a liquid condition and easily settles to the bottom of the digestion chamber, or, if it remains in suspension it can be let-off or pumped-off below water level.

The cover for keeping the sludge submerged must be gas-permeable so that it allows a passage therethrough of the gas ascending from the digestion chamber in small bubbles while completely preventing sludge passing therethrough.

The accompanying drawing illustrates an Imhoff tank fitted with the improved arrangement: Fig. 1 is a sectional plan view of the same, Fig. 2 is a perpendicular section through the same in connection with a gas collector, and Figs. 3$^a$ and 3$^b$ show a preferred form of the cover in a sectional side view and in a plan view respectively.

The Imhoff tank comprises a settling basin $a$ and a digestion chamber $b$, the floating sludge collecting in the upper part of the latter on the right and left from said settling basin. At the top of the digestion chamber $b$, a separate water chamber $m$ is located, at the bottom of which and thus below the water level therein a cover $i$ is located, that serves to keep the floating sludge in the digestion chamber completely submerged. The gas-permeable part of said cover need not extend over the whole surface of the digestion chamber but, for instance, the inclined parts $n$ of said cover, which is thus roof-shaped, may be gastight and designed to lead the gases to the gas-permeable top part of the cover $i$.

To let-off from time to time the floating sludge collected, lateral flap-controlled outlets $k$ of known art are provided in the walls of the digestion chamber below water level.

The keeping of the floating sludge at a certain distance below water level offers special advantages for a utilization of the gases from the digestion chamber because the presence of floating sludge in the gas bells $c$, which is thereby effectively prevented, would be particularly detrimental; the gases gained in said bells being led through pipes $d$ into a gas collector $e$.

The cover $i$ can be made of porous material, for instance of wood, filter slabs, or coarse concrete. For cleaning the same from time to time, it is recommendable to make it hollow for forcing therethrough gas or water, for which purpose the gas from the collector $e$ can be used and led by means of a fan $g$ through pipes $f$ into the cover $i$.

A particularly simple gas-permeable cover, which can also be easily removed, is formed of a wooden frame that is panelled with a series of narrow poplar-wood strips having a key-and-groove connection. The poplar-wood is porous and permits for some time an easy passage of gases therethrough. If the porosity diminishes, the fine slots between the single strips suffice for a passage of the gases therethrough. (Figs. 3$^a$/$^b$).

What we claim, is:—

1. A method of dealing with floating sludge in digestion chambers for sewage treatment, consisting in intentionally covering the floating sludge below the water level in the digestion chamber thereby keeping the same continuously submerged until its being eventually let-off, and allowing the gases ascending from the digestion chamber to escape to the water level directly through said covering, substantially as set forth.

2. A device for dealing with floating sludge in digestion chambers for sewage treatment, comprising a separate chamber at the top of the latter, and a gas-permeable cover located at the bottom of and thus below the water level in said water chamber.

3. A device for dealing with floating sludge in digestion chambers for sewage treatment, as specified in claim 2, flap-controlled outlets in the walls of the digestion chamber below said cover.

4. A device for dealing with floating sludge in digestion chambers for sewage treatment comprising a separate water chamber at the top of the latter, a roof-shaped cover having a gas-permeable top part located at the bottom of and thus below the water level in said water chamber, and flap-controlled outlets in the walls of the digestion chamber below said cover.

5. A device for dealing with floating sludge in digestion chambers for sewage treatment, comprising a separate water chamber at the top of the latter, a gas-permeable cover located at the bottom of and thus below the water level in said water chamber and consisting of a wooden frame panelled with a series of narrow poplar-wood strips having a key-and-groove connection, and flap-controlled outlets in the walls of the digestion chamber below said cover.

In testimony whereof we have hereunto set our hands.

KARL IMHOFF.
FRANZ FRIES.